United States Patent [19]
Sato et al.

[11] Patent Number: 5,119,694
[45] Date of Patent: Jun. 9, 1992

[54] METHOD FOR CONTROLLING VEHICULAR AUTOMATIC TRANSMISSIONS

[75] Inventors: Yoichi Sato, Utunomiya; Noboru Kondo, Yono; Hideo Furukawa, Tochigi, all of Japan

[73] Assignee: Honda Giken Kogyo Kabushiki Kaisha, Tokyo, Japan

[21] Appl. No.: 706,701

[22] Filed: May 29, 1991

[30] Foreign Application Priority Data

Jun. 25, 1990 [JP] Japan .................. 2-164257

[51] Int. Cl.$^5$ ............................................. B60K 41/18
[52] U.S. Cl. .................................. 74/866; 74/857; 74/870; 192/0.055; 192/0.09; 192/0.094
[58] Field of Search ................ 74/857, 859, 860, 861, 74/865, 866, 870; 192/0.055, 0.09, 0.094

[56] References Cited

U.S. PATENT DOCUMENTS

| | | | |
|---|---|---|---|
| 3,890,856 | 6/1975 | Miyauchi et al. | 74/867 X |
| 4,513,638 | 4/1985 | Nishikawa et al. | 74/866 |
| 4,572,030 | 2/1986 | Sakurai et al. | 74/866 |
| 4,584,908 | 4/1986 | Nishikawa et al. | 74/866 |
| 4,644,826 | 2/1987 | Kubo et al. | 74/866 |
| 4,648,289 | 3/1987 | Kubo et al. | 74/867 X |
| 4,653,622 | 3/1987 | Miyake | 74/866 X |
| 4,686,872 | 8/1987 | Aoki et al. | 74/867 X |
| 4,691,596 | 9/1987 | Nishikawa et al. | 74/867 X |
| 4,730,708 | 3/1988 | Hamano et al. | 192/0.033 |

FOREIGN PATENT DOCUMENTS 61-17757  1/1986  Japan .
61-244629 10/1986  Japan .

Primary Examiner—Richard Lorence
Assistant Examiner—William O. Trousdell
Attorney, Agent, or Firm—Armstrong, Nikaido, Marmelstein, Kubovcik & Murray

[57] ABSTRACT

A method for controlling an automatic transmission by carrying out speed changes in a vehicle in accordance with predetermined characteristics, said characteristics including engine load and vehicle speed, and said method comprising the step of carrying out a non-creeping control. The non-creeping control is carried out by stopping a power transmission to, or decreasing a transmitting torque to, an output side of the transmission when braking apparatus is operated under an idling operating condition in which the vehicle is substantially stopped. The non-creeping control is continued once the non-creeping control has been started even if thereafter the braking apparatus ceases to be operating.

9 Claims, 4 Drawing Sheets

METHOD FOR CONTROLLING VEHICULAR AUTOMATIC TRANSMISSIONS

BACKGROUND OF THE INVENTION

This invention relates to a method for controlling an automatic transmission of a vehicle whereby speed variation or shifting is carried out in accordance with predetermined speed-variation characteristics that depend on engine load and a vehicle speed, and in particular to a method for preventing the occurrence of creeping.

In a vehicle having mounted thereon an automatic transmission, a creeping phenomenon can occur wherein the vehicle continues to move at low speed when the accelerator pedal is released. Creeping increases at fast idle and consequently a large braking force is required to maintain the vehicle in a stopped condition.

A method of non-creeping control is disclosed in Japanese Published Unexamined Patent Application No. 17757/1986. It is disclosed therein that, when a braking apparatus of a vehicle is operated during idling while substantially stopped, non-creeping control is performed wherein transmission torque applied to an output side of the transmission, is decreased by upshifting the transmission from a first speed to a second speed, thereby restricting creeping. Another method in Japanese Published Unexamined Patent Application No. 244629/1986 is disclosed in which, in carrying out non-creeping control, a clutch is released to stop the transmission of power to the output side, or an engaging force of the clutch is lowered to decrease the transmission torque to the output side.

In the method of the above-described Japanese Published Unexamined Patent Application No. 17757/1986, non-creeping control is stopped when any of the following three conditions is not satisfied:

(1) vehicle speed is below a predetermined value (the vehicle is substantially stopped), (2) the opening degree of the engine's throttle valve is below a predetermined value (the throttle valve is substantially at idle), and (3) the braking apparatus is operated.

Therefore, when the braking apparatus is repeatedly engaged and disengaged while running on a traffic congested road, upshifting and downshifting between first and second speed is repeated. When non-creeping control is carried out by means of the clutch, the clutch is repeatedly engaged and disengaged. As a consequence, shocks generated due to speed change or to engagement of the clutch, impair the drivability (maneuverability) of the vehicle.

OBJECT AND SUMMARY OF THE INVENTION

This invention has an object of providing a method of controlling an automatic transmission of a vehicle that eliminates the above-described disadvantages associated with utilizing a braking apparatus for non-creeping control.

In order to attain the above-described object, this invention provides a method for controlling an automatic transmission of a vehicle by carrying out a speed change in accordance with predetermined speed change characteristics that depend on engine load and vehicle speed. The method provides non-creeping control by either stopping power transmission to, or decreasing a transmitting torque to, an output side of a transmission when the braking apparatus is operated at idle and the vehicle is substantially stopped. The non-creeping control continues once started, even if thereafter the braking apparatus ceases operation.

In this invention, the idling operating condition in which the vehicle is substantially stopped, refers to a condition in which the vehicle speed is zero or below a predetermined value close to zero, and in which the opening degree of the engine's throttle valve is in an idling opening (fully closed) or substantially closed.

When the braking apparatus is operated by the manipulation of a brake pedal, a parking lever, or the like, under an idling condition in which the vehicle is substantially stopped, non-creeping control begins, thereby restricting the occurrence of creeping.

Even if the braking apparatus thereafter ceases operation, non-creeping control is continued as long as the vehicle speed and the opening degree of the engine's throttle valve are respectively below predetermined values. As a result, continual intermittent non-creeping control, due to the ON-OFF operation of the braking apparatus, does not occur. Thus, shocks attributed to the intermittent non-creeping control are prevented.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF THE PREFERRED EMBODIMENTS

Figure 1:
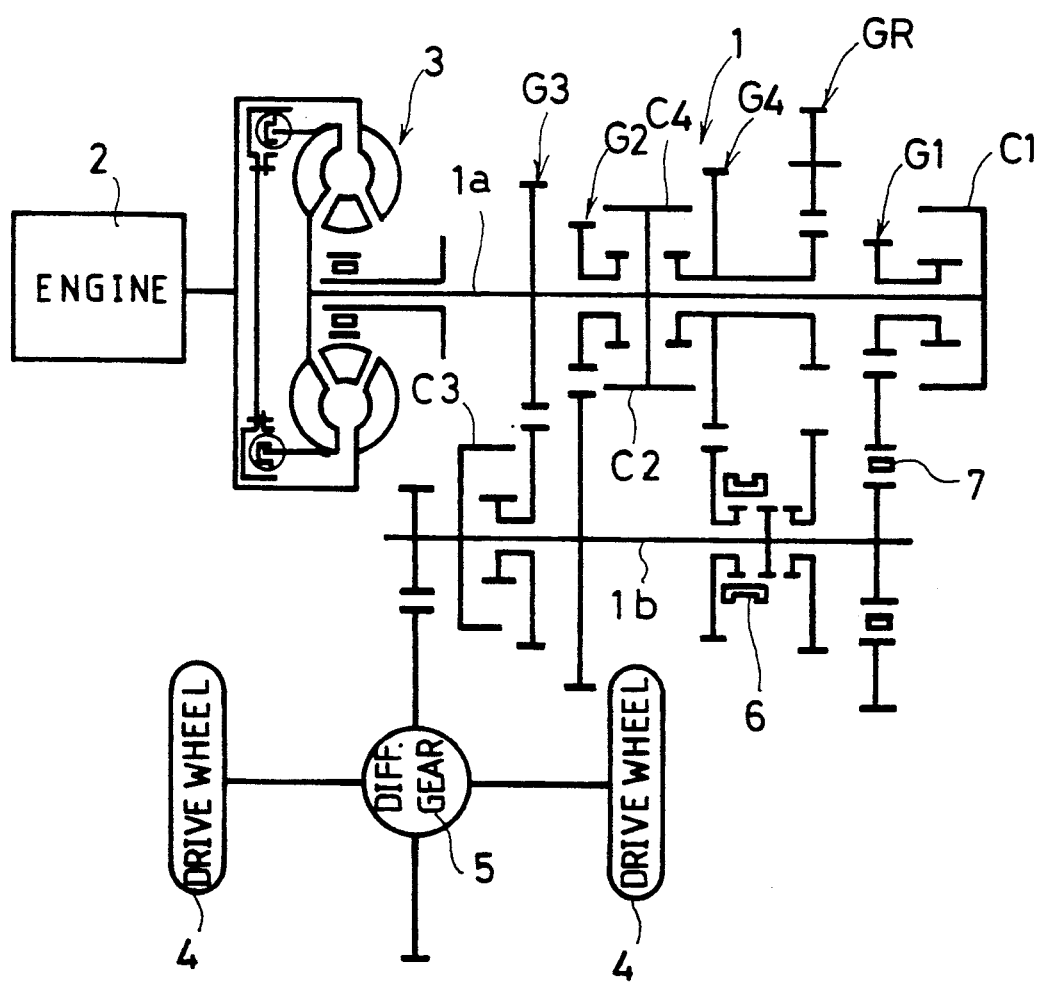
FIG. 1 is a diagram of one example of an automatic transmission of a vehicle to which this invention method is applied.

Referring to FIG. 1, a transmission 1 for changing or shifting vehicle speed (four forward speeds and one reverse speed) comprises first to fourth forward speed transmission trains G1, G2, G3, G4 and a reverse transmission train GR which are provided between input shaft 1a connected to engine 2 via hydraulic torque converter 3 and output shaft 1b connected to driving wheels 4 of a vehicle via differential gear 5. The forward speed transmission trains G1, G2, G3, G4 have first- to fourth-speed hydraulic clutches C1, C2, C3, C4 interposed respectively therein.

The reverse transmission train GR and the fourth-speed transmission train G4 commonly use the fourth-speed hydraulic clutch C4. These transmission trains G4, GR are selectively connected to the output shaft 1b via a selector gear 6. In the reverse range of the transmission, the reverse transmission train GR is engaged by shifting the selector gear 6 to a reverse side (shown on the right-hand side in the drawing) and also by supplying oil to the fourth-speed clutch C4.

A one-way clutch 7 is interposed in the first-speed transmission train G1 and is adapted to operate so as to allow the over-rotation of the output side. In the drive range in which automatic transmission is applied, the first-speed clutch C1 is constantly supplied with oil as described hereinafter and, when one of the second- to fourth-speed clutches C2, C3, C4 is supplied with oil, the power transmission through the first-speed gear train G1 is automatically stopped by one-way clutch 7.

Figure 2:
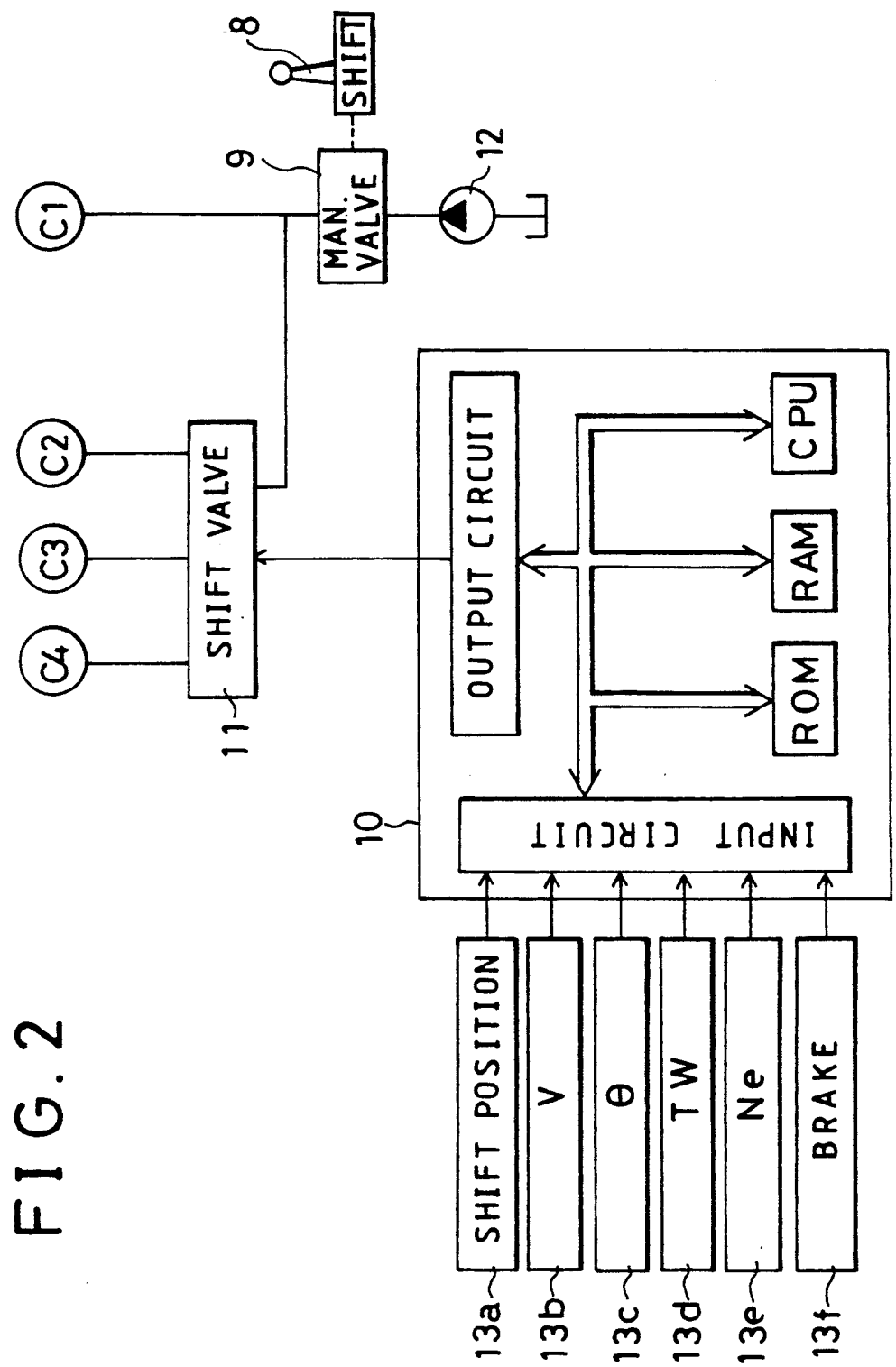
FIG. 2 is a block circuit diagram for speed-change control used for carrying out this invention method.

Each of the above-described hydraulic clutches C1, C2, C3, C4 is supplied with oil, as shown in FIG. 2, from a hydraulic oil source 12 via a manual valve 9 operated by interlocking shift lever 8 inside a vehicle chamber and shift valve unit 11 controlled by an electronic control circuit or microcomputer 10. The electronic control circuit 10 monitors the position of shift lever 8 by a signal from a position sensor 13a. When the shift lever 8 is shifted to the drive range, the first-speed clutch C1 is constantly supplied with oil via the manual valve 9. Concurrently, based on speed-change characteristics, (shown in FIG. 4) set by parameters of a vehicle speed and an opening degree of an engine's throttle valve as an engine load, control circuit 10 outputs a speed-change signal in accordance with real time operating conditions that are determined by signals input to the control circuit 10 from a vehicle speed sensor 13b and a throttle valve opening degree sensor 13c. Oil is selectively supplied to the second- to fourth-speed clutches C2, C3, C4 via the shift valve unit 11 in order to carry out automatic speed changing of the first to fourth speeds. In other words, in the first-speed range, a first-speed signal is output which cuts off the oil supplied to the second- to fourth-speed hydraulic clutches C2, C3, C4, thereby enabling only the first speed transmission train G1.

Figure 4:
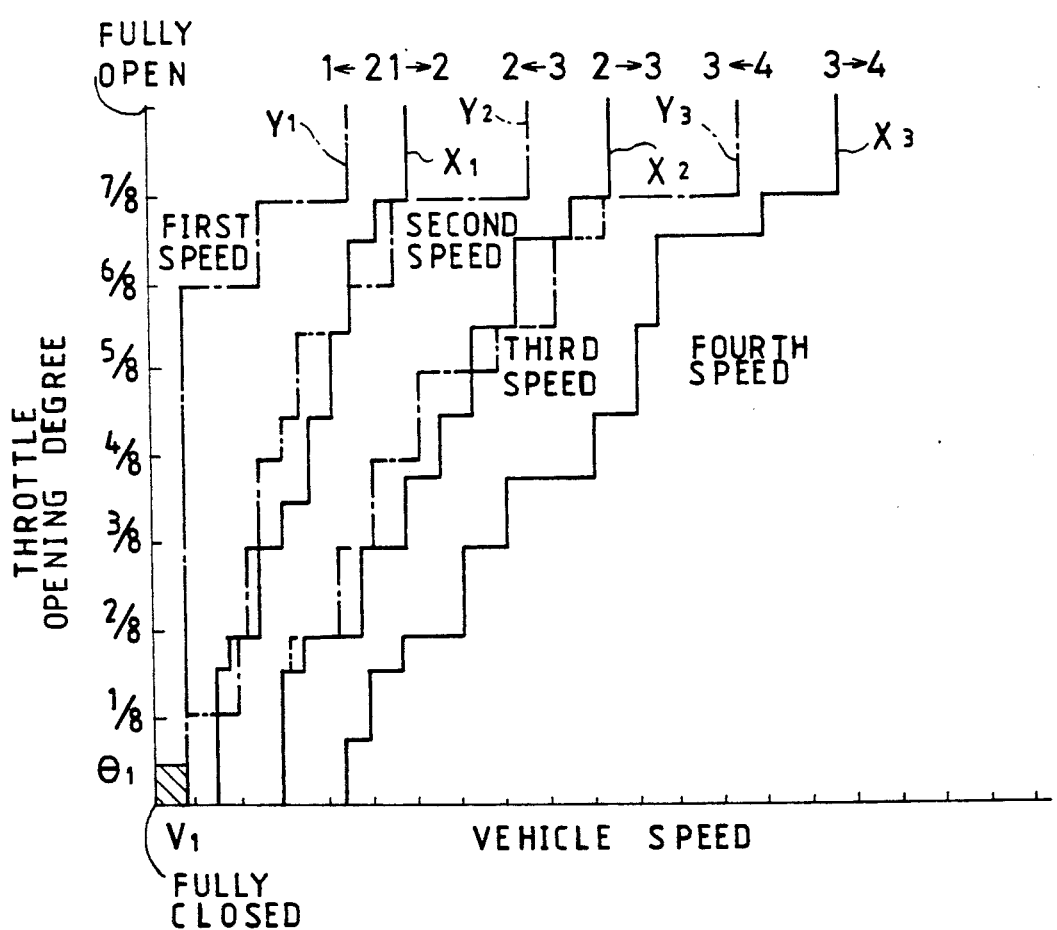
FIG. 4, is a diagram of speed change characteristics.

In the second- to fourth-speed ranges, speed-change signals of the second- to fourth-speed are output which selectively supply the oil to a corresponding hydraulic clutch among the second- to fourth-speed hydraulic clutches C2, C3, C4, that selectively engages the second- to fourth-speed transmission trains G2, G3, G4. In FIG. 4, $X_1$, $X_2$, $X_3$ represent characteristic curves of upshifting from first to second speed, second to third speed, and third to fourth speed, respectively. $Y_1$, $Y_2$, $Y_3$ represent characteristic curves of downshifting from second to first speed, third to second speed, and fourth to third speed, respectively.

For non-creeping control, the electronic control circuit 10 is programmed to output a second-speed signal when the drive range is selected, even though the operating conditions are in the first-speed range. The vehicle is thereby upshifted from the first speed to the second speed as soon as the operation of the braking apparatus has been confirmed by a signal from a brake switch 13f through the operation of the brake pedal, the parking lever or the like. The non-creeping control is performed when the operating conditions are within a hatched range of FIG. 4 covering a vehicle speed below the predetermined value of $V_1$, which is close to zero, and the opening degree $\Theta$ of the throttle valve below the predetermined opening degree $\Theta_1$ which is close to a fully closed condition. In other words, non-creeping control is performed when the vehicle is at idle and is substantially stopped.

In this embodiment, signals from an engine cooling water temperature sensor 13d and from an engine speed sensor 13e are input to the electronic control circuit 10. Non-creeping control is carried out only when the cooling water temperature TW is below a predetermined value $TW_1$ and the engine speed Ne is above a predetermined value $Ne_1$, i.e., only when the engine is in a fast idling condition (in which the creeping force increases). However, these conditions are not required by the present invention.

Figure 3:
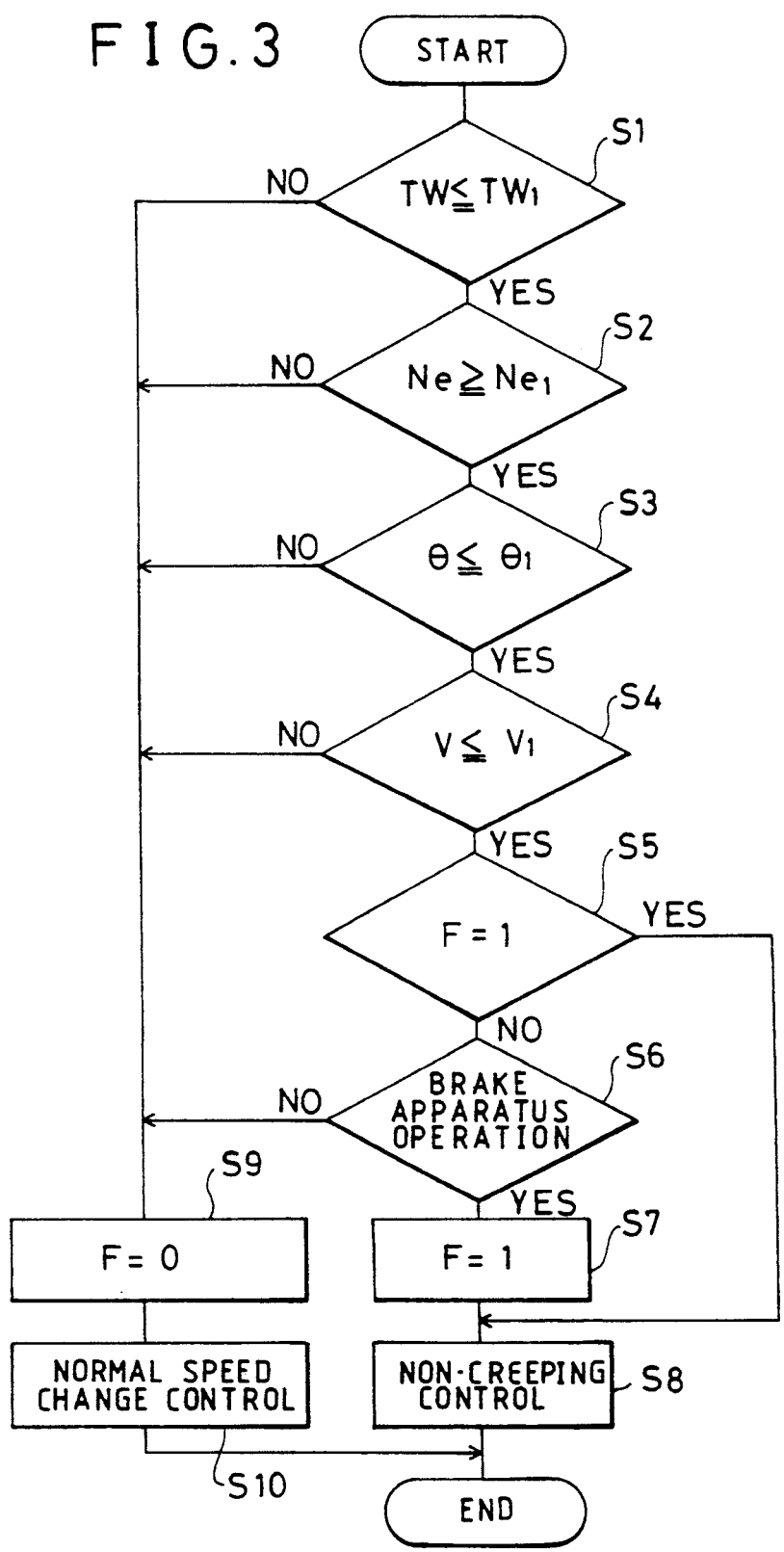
FIG. 3 is a flowchart showing a program for non-creeping control.

Non-creeping control is carried out when the drive range has been selected. Details of the control are shown in FIG. 3. First, in step S1 a determination is made as to whether $TW \leq TW_1$. In step S2, a determination is made as to whether $Ne \geq Ne_1$. In step S3, a determination is made as to whether $\Theta \leq \Theta_1$. In step S4, a determination is made as to whether $V \leq V_1$. If the results of these determinations are all "YES", the operation proceeds to step S5, where a determination is made as to whether a flag F is 1 or not. If a flag is not F=1, a determination is made in step S6 as to whether the braking apparatus is in operation or not. If the braking apparatus is in operation, the flag F is rewritten to 1 in step S7, and the operation then proceeds to step S8, where a non-creeping operation of outputting a second-speed signal is carried out.

As long as the conditions of $TW \leq TW_1$, $Ne \geq Ne_1$, $V \leq V_1$, and $\Theta \leq \Theta_1$ are satisfied, step S5 is determined to be "YES" from the next operation and, therefore, the operation proceeds to step S8 without passing through the steps of S6 and S7. In this manner, once the non-creeping operation has been started, the non-creeping operation can be carried out continuously even if the braking apparatus ceases to be operational.

If any of the above conditions is unsatisfied, the flag F is rewritten to zero in step S9 and the operation proceeds to step S10 to carry out a normal speed-change control in accordance with the speed-change characteristics.

Additionally, when carrying out non-creeping operation, upshifting to the third or fourth speed may also be carried out. Alternatively, the oil supply to the first-speed hydraulic clutch C1 may be stopped or the pressure of oil supplied to the clutch C1 may be decreased. Furthermore, the non-creeping operation may be carried out not only in the drive range but also in other running ranges such as the second-speed retaining range in which the oil is continuously supplied to the second clutch C2.

As can be seen from the above descriptions, according to this invention, once non-creeping control is begun, non-creeping control is continued regardless of operation or non-operation of the braking apparatus. Therefore, no shock occurs, thereby improving the drivability (maneuverability) contrary to the conventional method wherein, non-creeping control intermittently continues depending on the operation or non-operation of the braking apparatus.

It is readily apparent that the above-described invention has the advantage of wide commercial utility. It should be understood that the specific form of the invention hereinabove described is intended to be representative only, as certain modifications within the scope of these teachings will be apparent to those skilled in the art. Accordingly, references should be made to the following claims in determining the full scope of the invention.

What is claimed is:

1. A method for controlling an automatic transmission of a vehicle having an engine and a braking apparatus by changing speed in accordance with predetermined speed change characteristics, said characteristics including engine load and vehicle speed, said method comprising the steps of:

initiating non-creeping control by substantially decreasing torque transmitted to an output side of said automatic transmission when said engine is in an idling condition and said vehicle is stopped or substantially stopped and said braking apparatus is being operated; and continuing to decrease said torque transmitted to said output side of said automatic transmission in a same manner as during said non-creeping control as long as said engine remains in the idling condition and said vehicle is substantially stopped, even if operation of said braking apparatus is subsequently terminated.

2. A method for controlling an automatic transmission of a vehicle according to claim 1, wherein said non-creeping control is performed by upshifting said transmission.

3. A method for controlling an automatic transmission of a vehicle according to claim 1, wherein said non-creeping control is actuated by decreasing an engaging force of a clutch.

4. A method for controlling an automatic transmission of a vehicle having an engine and a braking apparatus by changing speed in accordance with predetermined speed change characteristics, said characteristics including engine load and vehicle speed, said method comprising the steps of:

initiating non-creeping control by substantially decreasing torque transmitted to an output side of said automatic transmission when said engine is in a fast idling condition and said vehicle is stopped or substantially stopped and said braking apparatus is being operated; and continuing to decrease said torque as long as said engine remains in said fast idling condition and said vehicle is substantially stopped, even if operation of said braking apparatus is subsequently terminated.

5. A method for controlling an automatic transmission of a vehicle according to claim 4, wherein said non-creeping control is performed by upshifting said transmission.

6. A method for controlling an automatic transmission of a vehicle according to claim 4, wherein said non-creeping control is actuated by decreasing an engaging force of a clutch.

7. A method for controlling an automatic transmission of a vehicle having an engine and a braking apparatus by changing speed in accordance with predetermined speed change characteristics, said characteristics including engine load and vehicle speed, said method comprising the steps of:

initiating non-creeping control by substantially decreasing torque transmitted to an output side of said automatic transmission when said engine is in a fast idling condition and said vehicle is stopped or substantially stopped and said braking apparatus is being operated; and continuing to decrease said torque transmitted to said output side of said automatic transmission in a same manner as during said non-creeping control as long as said engine remains in the fast idling condition and said vehicle is substantially stopped, even if operation of said braking apparatus is subsequently terminated.

8. A method for controlling an automatic transmission of a vehicle according to claim 7, wherein said non-creeping control is performed by upshifting said transmission.

9. A method for controlling an automatic transmission of a vehicle according to claim 7, wherein said non-creeping control is actuated by decreasing an engaging force of a clutch.

* * * * *